United States Patent Office 2,794,830
Patented June 4, 1957

2,794,830
PROCESS FOR THE PRODUCTION OF TEREPHTHALIC ACID

Bernhard Raecke, Werner Stein, and Hubert Schirp, Dusseldorf, Germany, assignors to Henkel & Cie. G. m. b. H., Dusseldorf-Holthausen, Germany, a corporation of Germany No Drawing. Application November 30, 1954, Serial No. 472,246

Claims priority, application Germany December 3, 1953

9 Claims. (Cl. 260—515)

This invention relates to a process for the production of terephthalic acid from benzoic acid salts, and more particularly to a process for the production of terephthalic acid from alkali metal salts of benzoic acid, in the presence of catalysts.

It is well known that alkali metal salts of terephthalic acid can be obtained by heating the sodium salts of benzoic acid until they are completely charred, or by fusing potassium benzoate with sodium formate in an open flame. These methods, however, have two serious disadvantages which make their use on an industrial scale impractical. These disadvantages are that the yields of terephthalic acid salts are very low, and that the starting materials which remain untransformed or unreacted are completely destroyed as a consequence of the high temperatures required to bring about charring or fusion by an open flame in the presence of oxygen.

A substantial improvement on these prior processes is disclosed in the copending application of Bernhard Raecke Serial No. 395,609, filed December 1, 1953, now abandoned, whereby improved yields of terephthalic salts are obtained and the unreacted starting materials are not destroyed and can be recovered for subsequent use. The process disclosed in said copending application essentially comprises heating potassium benzoate to high temperatures in the presence of carbon dioxide, whereby a carboxyl group is introduced into the benzoic acid salt molecule in the para-position, forming a potassium salt of terephthalic acid. In order to achieve a reaction sufficiently rapid for industrial purposes, it is necessary to heat the potassium benzoate to a temperature generally above 340° C. Moreover, in order to prevent the decomposition of the starting material at such high temperatures, it is necessary to carry out this transformation reaction in an atmosphere substantially free from oxygen, preferably in an autoclave containing carbon dioxide at superatmospheric pressures, and while agitating the reactants so as to insure uniform heating thereof.

The upper temperature limit for the reaction disclosed in said copending application is determined only by the dissociation temperature of the organic starting material. In general, however, it is not desirable to exceed a temperature of 450° C.

In accordance with said process, the starting material, potassium benzoate, may also be subjected to the transformation reaction in admixture with inert materials, such as, for example, metal powders, metal shavings, or sand, as well as in admixture with inert inorganic salts such as, for example, potassium carbonate, potassium sulfate, potassium chloride and the like.

It is an object of the present invention to provide a process for the production of terephthalic acid from potassium benzoate which will produce a greater yield of terephthalic acid than similar processes heretofore suggested.

Another object of the present invention is to provide catalysts for a process for the production of terephthalic acid from potassium benzoate, which will materially accelerate the rate of transformation and simultaneously cause the reaction to yield greater quantities of terephthalic acid than similar processes heretofore proposed.

Other objects and advantages of our invention will become apparent as the description thereof proceeds.

We have found that the transformation of potassium benzoate into potassium terephthalate can be materially accelerated and the amounts of potassium terephthalate produced considerably increased by heating potassium benzoate under the conditions disclosed in said copending application in the presence of certain catalysts. Such catalysts include metals, such as, for example, lead, zinc and mercury, and compounds of such metals, such as, for example, their oxides. We have further found that cadmium and its compounds, particularly cadmium oxide, are especially favorable catalysts for the above transformation reaction.

As catalysts may be used for example metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate and zinc terephthalate. The catalysts may be used as such or on carriers.

The amount of catalysts may be up to 15 percent by weight of the whole reaction mixture. Good results are obtained when using far lower amounts. The cadmium- or zinc-compounds may easily be recovered from waste liquors or filter residues.

As previously stated, the advantageous effects of the above catalysts are manifested by a material increase in the yield of potassium terephthalate and, consequently, terephthalic acid, as well as by an acceleration of the transformation reaction over certain simultaneously occurring side-reactions caused by the dissociation of the starting material.

As a consequence of the acceleration brought about by the presence of the catalysts in accordance with our invention, it is possible to carry out the transformation reaction at lower temperatures, at lower pressures, and even at atmospheric pressure.

The transformation reaction of potassium benzoate in the presence of the above-described catalysts, in accordance with our invention, results in the formation of a mixed product comprising varying amounts of untransformed potassium benzoate and potassium terephthalate. The transformation of these two potassium salts into the corresponding free acids, i. e. benzoic acid and terephthalic acid, and the subsequent separation thereof to recover terephthalic acid is a relatively simple procedure which is based upon the different solubilities of these two acids in water. In general, this procedure consists of dissolving the salt mixture, obtained by the transformation reaction in accordance with our invention, in water, removing impurities from the resulting solution by filtration, precipitating the corresponding free acids from the filtrate by the addition of mineral acids, such as hydrochloric acid or sulfuric acid, filtering off the precipitated organic acid mixture, and washing the benzoic acid out of the filter cake by repeatedly extracting the filter cake with hot water. The benzoic acid readily dissolves in hot water while the terephthalic acid, which is insoluble in either hot or cold water, remains behind as a solid residue. While the terephthalic acid thus obtained is relatively pure, it may be further purified by redissolving it in alkalis, filtering the resulting solution, and reprecipitating it by acidification with mineral acids. The alkaline solution may, if desired, also be modified by the addition of suitable absorbents, such as, for example, charcoal, fuller's earth. The purified terephthalic acid is virtually 100% pure.

The terephthalate produced by the transformation reaction of potassium benzoate in accordance with our invention may, however, also be employed directly for the production of derivatives of terephthalic acid, such as, for example, the dichloride or esters, using methods well known in the art.

Another method of separating the benzoic acid from the terephthalic acid is by selective sublimation.

In either case, the benzoic acid recovered can be retransformed into potassium benzoate and then re-used together with additional potassium benzoate to produce more terephthalic acid, as outlined above.

While the mechanics of the transformation of potassium benzoate into dipotassium terephthalate at elevated temperatures are not entirely understood, it is believed that it is brought about by a dissociation of the potassium benzoate into benzene and dipotassium terephthalate, some of the molecules of benzoate losing a carboxyl group to form benzene, while the detached carboxyl group attaches itself to some of the other molecules of benzoate in the para-position to form the terephthalate. This assumption is borne out by the fact that also considerable amounts of benzene are contained in the reaction mixture produced by the transformation reaction in accordance with our invention.

It is not absolutely necessary to carry out the transformation of potassium benzoate into dipotassium terephthalate in the presence of carbon dioxide. It will take place equally as well in an atmosphere of nitrogen. Apparently the minute amount of carbon dioxide formed by the dissociation of the starting material during the heating step is sufficient to supply the amount of carbon dioxide needed.

The potassium benzoate needed to produce terephthalic acid in accordance with our invention can be readily obtained by neutralizing aqueous solutions of benzoic acid with potassium hydroxide or potassium carbonate.

Since the transformation reaction in accordance with our invention takes place most advantageously in the absence of moisture, it is necessary that the potassium benzoate used as the starting material be completely dry. A particularly efficient method for producing dry potassium benzoate from the above potassium benzoate solutions is the spray-drying method or the drum-drying method, both of which are well known in industry. The resulting potassium benzoate is obtained in the form of a fine powder, which contains a very minute amount of moisture and which is particularly well adapted for use as the starting material in the transformation reaction as herein disclosed.

The following examples will further illustrate our invention and enable others skilled in the art to understand our invention more completely. It is understood, however, that there is no intention on our part to limit the invention to the examples given below.

Unless otherwise specified, the autoclaves which were used to carry out the reactions recited in the following examples had a net volume of 1000 to 1500 cc. and were provided with a stirring device made of refined steel. The autoclaves were also provided with a removable lining made of refined steel, and were heated by an electric heater. The potassium benzoate used as the starting material in all of these examples was obtained by spray-drying aqueous solutions thereof in a spray-drying apparatus (Krause system), employing a stream of hot air at a temperature of about 110° C. The dry powder obtained thereby was kept in a drying chamber overnight at 120° C. and was thereafter stored in an air-tight glass bottle, or similar container.

In all of the following examples the percentage yield of terephthalic acid was calculated on a basis of the amount of potassium benzoate which was charged into the autoclave, without taking into consideration the amounts of benzoic acid and side products, such as benzene, which were subsequently recovered.

*Example I*

150 gm. potassium benzoate and 6 gm. iron oxide ($Fe_2O_3$) were placed into an autoclave. The autoclave was then flushed with carbon dioxide, and thereafter carbon dioxide was introduced into the autoclave until the internal pressure reached 50 atmospheres gauge. The autoclave and its content were then heated to 400° C. and maintained at that temperature for about 6 hours. The highest pressure reached during that period in the interior of the autoclave was 169 atmospheres gauge. The autoclave was then permitted to cool to substantially room temperature. A dark gray product, having a strong odor of benzene, was withdrawn from the cooled autoclave and dissolved in 500 cc. water. The resulting solution was heated to boiling and filtered. The filter cake was repeatedly washed with hot dilute sodium hydroxide. The filtrates were collected and combined and the combined solutions were acidified with hydrochloric acid until no further precipitate formed. This precipitate was then filtered off and repeatedly extracted with boiling water. A white, water-insoluble residue remained which was found to be pure terephthalic acid. The yield was 36 gm., which is 23.2% of the theoretical yield. 15 gm. of benzoic acid were recovered from the solutions produced by the acid precipitation and the water extraction. The insoluble filter residue amount to 12 gm.

*Example II*

150 gm. potassium benzoate and 10 gm. zinc oxide were placed into an autoclave and the autoclave was flushed with carbon dioxide, as in Example I. Thereafter, more carbon dioxide was introduced until the internal pressure reached 50 atmospheres gauge. The autoclave and its contents were then heated to 400° C. and maintained at that temperature for about 6 hours. The maximum pressure in the interior of the autoclave reached 138 atmospheres gauge. The product produced thereby, which also had a strong odor of benzene, was dissolved in water and thereafter treated in the same manner as in Example I. The yield of terephthalic acid was 20 gm., which is 12.9% of the theoretical yield. The solutions produced by the acidification and water extraction yielded 23 gm. benzoic acid, and the insoluble filter residue weighed 12 gm.

*Example III*

150 gm. potassium benzoate were heated with 15 gm. metallic zinc in an autoclave at 400° C. for 6 hours in an atmosphere of carbon dioxide, as in Example I. Before heating the autoclave and its contents the pressure of carbon dioxide was adjusted to 50 atmospheres gauge, and the highest pressure reached during the heating step was 140 atmospheres gauge. The light gray product formed thereby, which had an odor of benzene, was dissolved in water and thereafter treated as in Example I. 48 gm. of terephthalic acid were produced, which corresponds to 30.9% of the theoretical yield. The waste solutions yielded 8 gm. benzoic acid and the insoluble filter residue weighed 18 gm.

*Example IV*

150 gm. potassium benzoate and 15 gm. metallic lead were heated in an autoclave at 400° C. for 6 hours in an atmosphere of carbon dioxide, as in Example I. Before heating, the pressure of carbon dioxide in the autoclave was adjusted to 50 atmospheres gauge and the maximum pressure reached during the heating step was 132 atmospheres gauge. After dissolving the dark gray product produced thereby, which had an odor of benzene, in water, and subsequent treatment of the solution as described in Example I, 56 gm. of pure terephthalic acid were recovered, which corresponds to a yield of 40% of the theoretical yield. The insoluble filter residue weighed 15 gm. No attempt was made in this case to recover the benzoic acid from the waste solutions.

*Example V*

161 gm. potassium benzoate, 69 gm. potassium carbonate and 10 gm. cadmium oxide were heated in a rotary autoclave at 450° C. for 6 hours in an atmosphere of carbon dioxide, as described in Example I. Before heating the autoclave and its contents, the internal pressure of carbon dioxide was adjusted to 50 atmospheres gauge and the maximum pressure reached during the heating step was 180 atmospheres gauge. The product produced thereby weighed 201 gm. and had a strong odor of benzene. 90 gm. of this product were dissolved in hot water, the hot solution was filtered, and the filtrate was acidified with hydrochloric acid until no further precipitate formed. The precipitate thus obtained was extracted with hot water, as described in Example I. 30.3 gm. of pure terephthalic acid were obtained thereby, which corresponds to 40.3% of the theoretical yield. The waste solutions yielded 2.4 gm. benzoic acid by extraction with ether.

*Example VI*

117 gm. potassium benzoate, 50 gm. potassium carbonate and 11 gm. cadmium oxide were heated in a rotary autoclave at 450° C. for 6 hours in an atmosphere of carbon dioxide. As in the preceding example, the pressure of carbon dioxide in the autoclave was adjusted to 50 atmospheres gauge before the autoclave and its contents were heated. The product obtained thereby weighed 158 gm. Further treatment of 100 gm. of this product by dissolving it in water, filtering the solution, precipitating the acids by acidification, and purifying the precipitate by extraction with hot water, as in Example I, yielded 31.5 gm. pure terephthalic acid, which corresponds to 41% of the theoretical yield.

*Example VII*

A mixture of 161 gm. potassium benzoate, 25 gm. potassium carbonate and 10 gm. cadmium oxide were heated in a vessel at 440° C. for 4 hours in an atmosphere of carbon dioxide at atmospheric pressure. The product produced thereby weighed 158 gm. When 100 gm. of this product were dissolved in water and the resulting solution was treated as in Example I, 18.4 gm. of terephthalic acid were obtained, which corresponds to 17.5% of the theoretical yield.

*Example VIII*

161 gm. potassium benzoate, 64 gm. potassium carbonate and 10 gm. cadmium oxide were placed into a rotary autoclave. Thereafter, the interior of the autoclave was flushed with nitrogen and the pressure of nitrogen was adjusted to 10 atmospheres gauge. Subsequently, the autoclave and its contents were heated to 450° C. and maintained at that temperature for approximately 6 hours. The highest pressure reached in the interior of the autoclave was 50 atmospheres gauge. The product produced thereby was dissolved in water and subsequently treated as described in Example I. The yield of terephthalic acid was 17.4% of the theoretical yield.

*Example IX*

145 gm. sodium benzoate, 53 gm. sodium carbonate and 10 gm. cadmium oxide were placed into a rotary autoclave and heated at 500° C. for 4 hours in an atmosphere of carbon dioxide. Before heating the autoclave and its contents, the pressure of carbon dioxide was adjusted to 50 atmospheres gauge. The pressure at the end of the run was 235 atmospheres gauge at a temperature of 500° C. The product produced thereby weighed 175 gm. 100 gm. of this product were dissolved in water and further treated in the manner described in Example I. 8.4 gm. terephthalic acid were obtained, which corresponds to a theoretical yield of 8.5%.

*Example X*

A mixture comprising 6.7 gm. rubidium benzoate, 2 gm. rubidium carbonate, and 0.4 gm. cadmium fluoride were placed into an autoclave having a net volume of 20 ccm. and heated to 390–400° C. for 5 hours. Before heating the autoclave and its contents carbon dioxide was pressed into the autoclave, the pressure being adjusted to 40 atmospheres gauge. The autoclave and its contents were then allowed to cool to substantially room temperature. The grayish black product produced had an odor of benzene. After being dissolved in water it was treated as described in Example I. The yield of pure terephthalic acid was 1.4 gm.

*Example XI*

A mixture of 100 g. potassium benzoate and 3 gm. cadmium fluoride was placed into an autoclave made of iron and completely covered by windings for electrical heating. The autoclave was then closed, the air was flushed out with carbon dioxide, and the autoclave was rendered air-tight. Thereafter, the introduction of carbon dioxide was continued until the pressure in the interior reached 10 atmospheres gauge. The contents of the autoclave were then heated for 2 hours to 440° C. During this time the pressure in the interior of the autoclave was kept constantly at 10 atmospheres gauge, blowing off the surplus of carbon dioxide and the benzene being formed during the operation. The autoclave and its contents were then permitted to cool to substantially room temperature. 75.7 gm. raw product were thus received. After being dissolved in water they were treated as described in Example I. The yield of pure terephthalic acid amounted to 42.6 gm. which represents 41.0% calculated on potassium benzoate and 82.1% of theory. (By "theory" the rearrangement according to the formula $$2C_6H_5.COOK \rightarrow KOOC.C_6H_4.COOK + C_6H_6$$

is to be understood.)

When using 5.5 gm. cadmium phthalate instead of the 3 gm. cadmium fluoride and proceeding in the same manner as above described 79.8 gm. raw product containing 42.7 gm. terephthalic acid were obtained. That equals 41.15% calculated on the used potassium benzoate and 82.3% of theory.

When using 7 gm. cadmium benzoate instead of the 3 gm. cadmium fluoride and proceeding in the same manner as above described 77.9 gm. raw product containing 43.6 gm. terephthalic acid were obtained. That equals 42% calculated on the used potassium benzoate and 84% of theory.

*Example XII*

In the same manner as described in the preceding example a mixture of 100 gm. potassium benzoate and 2 gm. cadmium fluoride were heated to 440–445° C. The heating was continued for 4 hours during which time a carbon dioxide pressure of 10 atmospheres gauge was constantly maintained. After cooling of the autoclave 77.0 gm. raw product containing 45.7 gm. pure terephthalic acid were received. That equals 44.0% calculated on the used potassium benzoate and 88% of theory. 3.3 gm. benzoic acid were recovered by extraction of the mother liquor with ether. The whole yield of aromatic carboxylic acid equals 92% of theory.

While we have disclosed certain preferred embodiments of our invention, we wish it to be understood that changes and modifications can be made therein without departing from the spirit of our invention or the scope of the following claims and that any reaction theories set

We claim:

1. The process of producing terephthalic acid which comprises heating an alkali metal benzoate to a temperature above 340° C. and below the decomposition temperature of the said starting material in a substantially oxygen-free, inert atmosphere and in the presence of a catalyst selected from the group consisting of iron, lead, zinc, mercury, cadmium, and their compounds, until a substantial amount of di-alkali metal terephthalate is formed, converting the di-alkali metal terephthalate into free terephthalic acid, and separating the terephthalic acid from the reaction mixture.

2. The process of producing terephthalic acid, which comprises heating an alkali metal benzoate selected from the group consisting of sodium benzoate, potassium benzoate and rubidium benzoate to a temperature above 340° C. and below the decomposition temperature of the said starting material in a substantially oxygen-free, inert atmosphere and in the presence of a catalyst selected from the group consisting of iron, lead, zinc, mercury, cadmium, and their compounds, until a substantial amount of di-alkali metal terephthalate is formed, dissolving the resulting reaction mixture in water, converting the dissolved terephthalate into terephthalic acid, and separating the terephthalic acid from the solution.

3. The process of producing a di-alkali metal terephthalate, which comprises heating an alkali metal benzoate to a temperature above 340° C. and below the decomposition temperature of the said starting material in a substantially oxygen-free, inert atmosphere in the presence of carbon dioxide at pressures ranging from atmospheric pressure to 235 atmospheres gauge and in the presence of a catalyst selected from the group consisting of iron, lead, mercury, zinc, cadmium, and their compounds, to introduce a second alkali metal carboxyl group into the benzene nucleus in the para-position.

4. The process of producing potassium terephthalate, which comprises heating potassium benzoate to a temperature above 340° C. and below the decomposition temperature of the said starting material in a substantially oxygen-free, inert gas at pressures ranging from 10 to 50 atmospheres gauge and in the presence of cadmium oxide as a catalyst, to introduce a second potassium carboxyl group into the benzene nucleus in the para-position.

5. The process of producing terephthalic acid as in claim 4, wherein said inert gas is carbon dioxide.

6. The process of producing terephthalic acid as in claim 4, wherein said inert gas is nitrogen.

7. The process of producing terephthalic acid as in claim 1, comprising in addition heating said alkali metal salt of benzoic acid in an autoclave and at elevated pressures.

8. The process of producing terephthalic acid as in claim 1, comprising in addition agitating said alkali metal salt of benzoic acid while heating the same.

9. The process of producing terephthalic acid, which comprises heating potassium benzoate to a temperature between 340° C. and 500° C. in a substantially oxygen-free, inert atmosphere at pressures ranging from atmospheric pressure to about 235 atmospheres gauge in the presence of cadmium oxide as a catalyst and in the presence of an inert salt selected from the group consisting of potassium carbonate, potassium sulfate and potassium chloride, until a reaction mixture comprising a substantial amount of dipotassium terephthalate is formed, converting the dipotassium terephthalate into terephthalic acid, and separating the terephthalic acid from said reaction mixture.

No references cited.